UNITED STATES PATENT OFFICE.

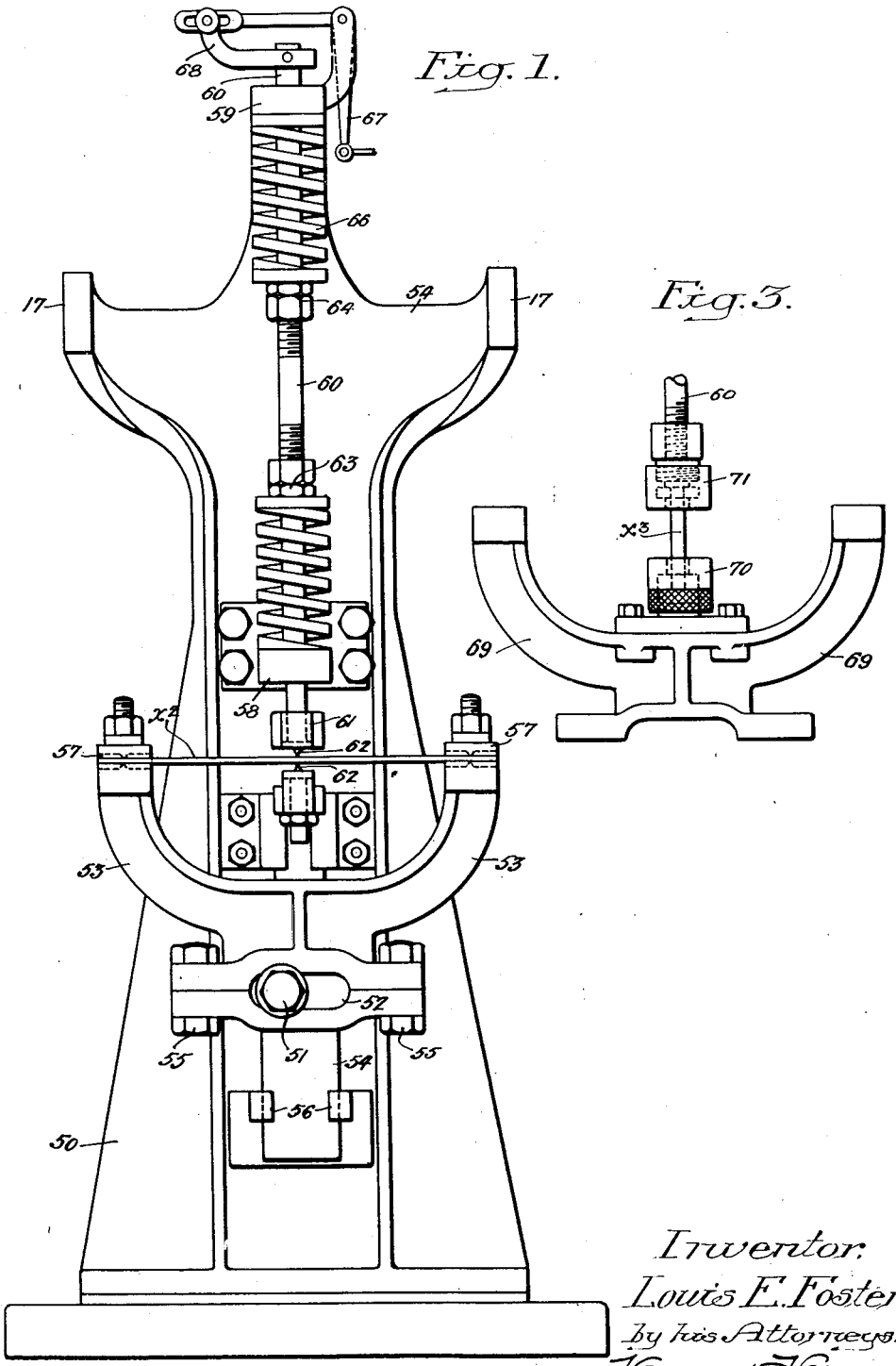

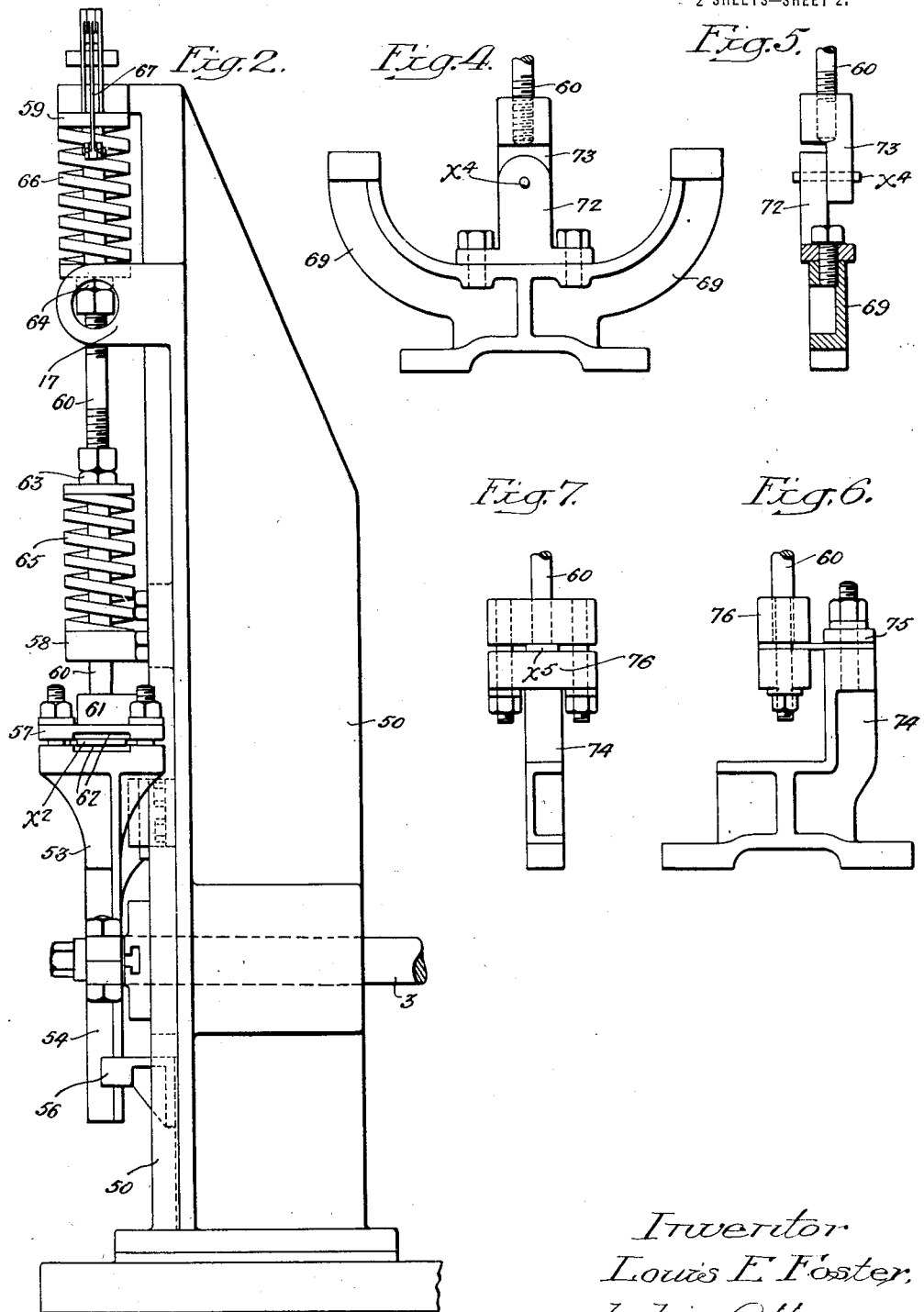

LOUIS E. FOSTER, OF ANNAPOLIS, MARYLAND, ASSIGNOR TO TINIUS OLSEN TESTING MACHINE COMPANY, OF PHILADELPHIA, PENNSYLVANIA, A CORPORATION OF PENNSYLVANIA.

TESTING MACHINE.

1,409,842.   Specification of Letters Patent.   Patented Mar. 14, 1922.

Original application filed January 8, 1916, Serial No. 71,047. Divided and this application filed May 10, 1919. Serial No. 296,132.

*To all whom it may concern:*

Be it known that I, LOUIS E. FOSTER, a citizen of the United States, residing in Annapolis, Anne Arundel County, State of Maryland, have invented the Testing Machine, (being a division of my application Serial No. 71,047, filed January 8, 1916,) of which the following is a specification.

One object of my invention is to provide a machine whereby a specimen of material to be tested may be subjected to the stress applied alternately in opposite directions with a view to determining its endurance;—the invention particularly contemplating a novel combination of parts whereby it shall be possible to utilize the apparatus to apply such alternate stress in a number of different ways.

Another object of the invention is to provide a simple, substantial and commercially practical machine which may be conveniently utilized in testing a bar of material to determine its endurance when it is repeatedly bent in opposite directions when subjected to alternate tension and compression, when subjected to shearing stress alternately applied in opposite directions, or when subjected to combined shearing and bending stresses.

These objects and other advantageous ends I attain as hereinafter set forth, reference being had to the accompanying drawings, in which—

Figs. 1 and 2 are front and side elevations of a machine constructed in accordance with my invention, the recording mechanism being omitted and the parts being arranged for testing the endurance of a specimen when subjected to bending stresses applied alternately in opposite directions;

Fig. 3 is an elevation of the yoke for specimen engaging clamps designed for use in the machine shown in Figs. 1 and 2 when the latter is used for alternate compression and tension tests;

Figs. 4 and 5 are respectively front and side elevations the latter being partly in section, showing the specimen-holding members for use in making shearing tests; and Figs. 6 and 7 are respectively front and side elevations of the specimen-holding members used for making combined bending and shearing tests.

In the above drawings 50 represents a main frame casting providing a bearing for a mechanically driven shaft 3 provided with a crank pin 51. This pin is operative in a slot 52 formed by suitably recessing the adjacent faces of a yoke 53 and of a guide piece 54 which are shown as suitably connected by bolts 55. The member 54 is vertically movable in guides 56 supported on the frame and the yoke member 53 is formed with two branches having at their extremities clamps 57 whereby a test bar extending horizontally between them may be rigidly held at its ends. The frame 50 is likewise provided with two spring seats 58 and 59 of which the latter is vertically above the former and which are both perforated to permit of the passage of a vertically reciprocable bar 60.

At its lower end this bar has a head 61 supporting a pair of knife edges 62 spaced apart to engage the opposite faces of a test bar or plate $x''$ whose ends are rigidly held by clamps 57 to the yoke 53. Said rod has upon it two abutments 63 and 64 formed by nuts threaded thereon, between the first of which and the seat 58 is mounted a spring 65, while a second spring 66 is similarly mounted between the nut 64 and the seat 59. Suitable recording apparatus is connected to the upper end of the rod 60, as for example in the manner illustrated in Figs. 1 and 2 of my application for Patent #71,047, filed January 8, 1916, and under operating conditions the rotation of the shaft carrying the crank pin 51 will vertically reciprocate the yoke piece 53 with the test piece $x''$, which in view of the resistance offered by the two springs 65 and 66, exerted through the head 61 which engages it at the middle, will be bent alternately in opposite directions from its normal unstressed position, until it breaks. A record of the performance of this test specimen is made through the medium of the recording apparatus actuated from the lever 67, one of whose arms is connected to an arm 68 fixed to the upper end of the rod 60.

If it be desired to employ my machine to test the endurance of a specimen when subjected to alternate tension and compression, the yoke piece 53 may be replaced by a slightly modified yoke 69, Fig. 3, which carries a clamp 70 for engaging one end of a test rod $x^3$, whose second end is likewise engaged by a clamp 71 carried by the lower end of the rod 60. Obviously when the yoke 69 is reciprocated as described in the case of the yoke 53, alternate compressive and tensile stresses are applied to the test specimen. For making shearing tests, specimen-engaging heads 72 and 73 (Figs. 4 and 5) may be mounted respectively on the yoke 69 and rod 60 so that the desired stresses may be applied to a test specimen $x^4$.

Again, as shown in Figs. 6 and 7, the yoke 69 may be replaced by a member 74 having a clamp 75 for rigidly gripping one end of a test specimen $x^5$ in the shape of a flat plate or bar. In this case the rod 60 carries a clamping head 76 for engaging the second end of said plate or bar $x^5$, so that when the member 74 is vertically reciprocated, the relatively short test specimen is subjected to shearing as well as bending stresses applied alternately in the opposite directions.

It is noted that in that form of my machine shown in Figs. 1 and 2 I provide arms 17 similar to those shown in Figs. 1 and 2 of my application aforesaid, so that if desired it may be conveniently equipped to perform the torsion tests for which the machine of said application is particularly designed.

I claim:

1. The combination in a testing machine of a frame; a substantially U-shaped yoke slidably mounted thereon; means for reciprocating the yoke, a member also slidably guided in the frame for movement substantially in the line of movement of said yoke; with means on the yoke for gripping the ends of a test specimen and holding it in a line at right angles to the line of movement of said yoke; and other means on said member for operatively engaging the test specimen between its points of engagement by the yoke.

2. The combination in a testing machine of a vertically extended frame; a horizontal shaft journalled thereon and having a crank; a yoke vertically guided on the frame and having a slot for the reception of the crank; clamps for a test specimen carried by the branches of the yoke; a vertically reciprocable bar slidably guided by the frame; a head for said bar having a pair of spaced knife edges positioned to engage the opposite faces of a test bar held by the clamps of the yoke; with spring means for opposing vertical movement of said bar.

In witness whereof I affix my signature.

LOUIS E. FOSTER.